United States Patent
Mueller et al.

(10) Patent No.: US 6,230,804 B1
(45) Date of Patent: May 15, 2001

(54) STRESS RESISTANT CEMENT COMPOSITIONS AND METHODS FOR USING SAME

(75) Inventors: Dan T. Mueller, Cypress; Virgilio G. Boncan; Jimmy P. Dickerson, both of Spring, all of TX (US)

(73) Assignee: BJ Services Company, Houston, TX (US)

(*) Notice: Subject to any disclaimer, the term of this patent is extended or adjusted under 35 U.S.C. 154(b) by 0 days.

(21) Appl. No.: 08/995,070

(22) Filed: Dec. 19, 1997

(51) Int. Cl.⁷ .................................................. E21B 33/13
(52) U.S. Cl. ............................................ 166/293; 166/294
(58) Field of Search .................................. 166/292, 293, 166/294

(56) References Cited

U.S. PATENT DOCUMENTS

| | | | |
|---|---|---|---|
| 3,563,313 | 2/1971 | Spangle | 166/292 |
| 3,581,825 | 6/1971 | Messenger | 166/288 |
| 3,887,385 | 6/1975 | Quist et al. | 106/96 |
| 4,102,400 | 7/1978 | Crinkelmeyer et al. | 166/283 |
| 4,132,555 | 1/1979 | Barrable | 106/90 |
| 4,202,413 | 5/1980 | Messenger | 166/292 |
| 4,257,483 | 3/1981 | Morris et al. | 166/292 |
| 4,274,881 | 6/1981 | Langton et al. | 106/98 |
| 4,300,633 | 11/1981 | Stewart | 166/250 |
| 4,328,036 | 5/1982 | Nelson et al. | 106/85 |
| 4,478,640 | 10/1984 | Holland | 106/76 |
| 4,482,379 | 11/1984 | Dibrell et al. . | |
| 4,640,361 | 2/1987 | Smith et al. | 166/288 |
| 4,902,170 | 2/1990 | Knox et al. | 405/225 |
| 4,957,556 | 9/1990 | Kunbargi | 106/693 |
| 4,968,349 | 11/1990 | Virtanen | 106/707 |
| 5,058,679 | 10/1991 | Hale et al. | 166/293 |
| 5,106,423 | 4/1992 | Clarke | 106/789 |
| 5,125,455 | 6/1992 | Harris et al. | 166/292 |
| 5,158,613 | * 10/1992 | Sargeant et al. | 106/737 |
| 5,159,980 | 11/1992 | Onan et al. | 166/294 |
| 5,183,506 | 2/1993 | Zhang | 106/739 |
| 5,293,938 | 3/1994 | Onan et al. | 166/294 |
| 5,343,950 | * 9/1994 | Hale et al. | 166/293 |
| 5,421,409 | 6/1995 | Mueller et al. | 166/292 |
| 5,484,019 | 1/1996 | Griffith | 166/293 |
| 5,564,503 | 10/1996 | Longbottom et al. | 166/313 |
| 5,571,318 | 11/1996 | Griffith et al. . | |
| 5,588,488 | 12/1996 | Vijn et al. | 166/293 |
| 5,688,844 | 11/1997 | Chatterji et al. | 524/8 |
| 5,711,383 | * 1/1998 | Terry et al. | 175/72 |

FOREIGN PATENT DOCUMENTS

| | | |
|---|---|---|
| 0920446 | 3/1963 | (GB) . |
| 1469954 | 4/1977 | (GB) . |
| 10216628 | 2/1997 | (JP) . |
| 1636367 | 3/1991 | (SU) . |
| WO 89/02878 | 4/1989 | (WO) . |

OTHER PUBLICATIONS

Hogg, "Comparison of Multilateral Completion Scenarios and Their Applications," SPE 38493, Society of Petroleum Engineers, Inc.; Offshore Europe Conference held in Aberdeen, Scotland, Sep. 9–12, 1997.

(List continued on next page.)

Primary Examiner—William Neuder
Assistant Examiner—Zakiya Walker
(74) Attorney, Agent, or Firm—O'Keefe, Egan & Peterman, LLP (57) ABSTRACT

Aluminum silicate and/or fibrous mineral-containing cement compositions for cementing wellbores in high stress environments, such as for cementing multi-lateral completions. The cement compositions typically comprise a mixture of a reactive aluminum silicate and/or fibrous mineral such as wollastonite, and may include one or more other additives. The cement compositions may be used to produce set cements offering improved compressive strength, flexural strength, and/or tensile strength over conventional cement compositions.

6 Claims, 1 Drawing Sheet

OTHER PUBLICATIONS

Morsy, El–Enein, Hanna, "Microstructure and Hydration Characteristics of Artificial Pozzolana–Cement Pastes Containing Burnt Kaolinite Clay," *Cement and Concrete Research*, 27(9), 1307, 1997.

"MetaMax® High Reactivity Metakaolin (HRM) for Improved Pre–cast Concrete," Engelhard Corporation Pigments and Additives Group, C–8–E, Jan. 1997, 7 pages.

Thiercelin, Dargaud, Baret, Rodriguez "Cement Design Based on Cement Mechanical Response," SPE 38598, Society of Petroleum Engineers, Inc.; SPE Annual Technical Conference and Exhibition held in San Antonio, Texas, Oct. 5–8, 1997.

Marsh, "An alternative to silica fume?" *Concrete Products*, EC–6729, Nov. 1994.

"Horizontal Drilling: Multi–Lateral and Twinned Wells," Sperry–Sun Drilling Services, 1993.

Low and Beaudoin, "The Flexural Toughness and Ductility of Portland Cement–Based Binders Reinforced With Wollastonite Micro–Fibres," Cement and Concrete Research, 24(2), 250, 1994.

Low and Beaudoin, "Flexural Strength and Microstructure of Cement Binders Reinforced With Wollastonite Micro–Fibres," 10 pages. (undated).

Rieger and Vanderbilt, "Tale, Pyrophyllite, and Wollastonite", pp 38–40, 42–44. (Undated).

M–90–339 Silicate Portland Cement Admixture, Engelhard Corporation, Specialty Minerals and Colors (undated).

Ratinov and Rozenberg, "Chap. 8—Antifreezing Admixtures" in Concrete Admixtures Handbook, Properties, Science, and Technology, Edited by V. S. Ramachandran, pp. 430–463, 1984.

Ramachandran, V.S., "Concrete Admixtures Handbook Properties, Science, and Technology," Noyes Publications, Library of Congress No. 84–4125 (1984).

Caldarone et al., "High–Reactivity Metakaolin: A New Generation Mineral Admixture," 6 pages (authorized reprint from: Nov. 1994 issue of Concrete International).

Engelhard Corporation "MetaMax® EF High Reactivity Metakaolin (HRM) Pozzolanic Mineral Admixture" 2 pages (1997).

Engelhard "What Makes MetaMax® High Reactivity Metakaolin Stand Out? Let Us Enlighten You" 1 page, (1996).

Tom Kuennen, "Metakaolin might" Concrete Products, 4 pages (May 1996).

Gruber et al., "Exploring The Pozzolanic Activity of High Reactivity Metakaolin," World Cement Research and Development, 6 pages (Feb. 1996).

Improve Cement–Based Products with High Reactivity Metakaolin 2 pages (undated).

Khatib et al., "Sulphate Resistance of Metakaolin Mortar," Cement and Concrete Research, vol. 28, No.1 pp. 83–92 (1998).

American Petroleum Institute, "Cement Sheath Evaluation" API Technical Report 10TR1 First Edition (Jun. 1996).

Thrush, Paul W., *comp.*, "A dictionary of mining, mineral, and related terms," compiled and edited by Paul W. Thrush and the Staff of the Bureau of Mines, [Washington] U.S. Department of the Interior, Bureau of Mines, pp. 162, 606 and 696, (1968).

George O. Suman, Jr. and Richard C. Ellis, "World Oil Cementing Hand Book" (1977).

J.J. Jutten, D. Guillot and P.A. Parcevaux, Dowell Schlumberger, "Relationship Between Cement Composition, Mechanical Properties and Cement–Bond–Log Output", SPE 16652, pp. 75–82 (Feb. 1989).

P.A. Parcevaux and P.H. Sault, "Cement Shrinkage and Elasticity: A New Approach for A Good Zonal Isolation" SPE 13176, (1984).

K.J. Goodwin, Mobil E&P Services Inc. and R.J. Crook, Halliburton Services, "Cement Sheath Stress Failure" SPE 20453 (Dec. 1992).

R.B Carpenter, J.L. Brady and G.G. Blount, Arco Oil & Gas Co., "Effects of Temperature and Cement Admixes on Bond Strength" SPE 22063 (May 31 1991).

Louis H. Eilers, Erik B. Nelson and Larry K. Moran, "High Temperature Cement Compositions: Pectolite, Scawtite, Truscotite or Xonolite, Which Do You Want?" SPE 9286 (Jul. 1983).

* cited by examiner

STRESS RESISTANT CEMENT COMPOSITIONS AND METHODS FOR USING SAME

BACKGROUND OF THE INVENTION

1. Field of the Invention

This invention relates generally to methods and compositions for cementing, and more specifically to methods and compositions for cementing in high stress environments. In particular, this invention relates to methods and compositions for well cementing utilizing mixtures of hydraulic cement and aluminum silicate and/or fibrous materials such as wollastonite, in high stress environments such as encountered in multi-lateral well completions.

2. Description of Related Art

Cementing is a common technique employed during many phases of wellbore operations. For example, cement may be employed to cement or secure various casing strings and/or liners in a well. In other cases, cementing may be used in remedial operations to repair casing and/or to achieve formation isolation. In still other cases, cementing may be employed during well abandonment. Cement operations performed in wellbores under high stress conditions may present particular problems, among other things, difficulty in obtaining good wellbore isolation and/or maintaining mechanical integrity of the wellbore. These problems may be exacerbated in those cases where wellbore and/or formation conditions promote fluid intrusion into the wellbore, including intrusion of water, gas, or other fluids.

In a wellbore, cement may be used to serve several purposes. Among these purposes are to selectively isolate particular areas of a wellbore from other areas of the wellbore. For example, cement is commonly placed in the annulus created between the outside surface of a pipe string and the inside formation surface or wall of a wellbore in order to form a sheath to seal off fluid and/or solid production from formations penetrated by the wellbore. This isolation allows a wellbore to be selectively completed to allow production from, or injection into, one or more productive formations penetrated by the wellbore. In other cases cement may be used for purposes including, but not limited to, sealing off perforations, repairing casing leak/s (including leaks from damaged areas of the casing), plugging back or sealing off the lower section of a wellbore, sealing the interior of a wellbore during abandonment operations, etc.

The economic success of a drilling operation often hinges upon the ability to establish zonal isolation within a cemented wellbore. Once established, maintaining this zonal isolation is typically impacted by the particular stress environment found while the well is being completed and produced. During the life of a well, the cement sheath may be exposed to stresses imposed by well operations including perforating, hydraulic fracturing, high temperature-pressure differentials, etc. Further, if the well is completed using a complex completion such as a multi-lateral system, the cement sheath may be subject to shattering and subsequent loss of bond due to pipe impact.

Conventional well cement compositions are typically brittle when cured. These conventional cement compositions often fail due to stresses, such as compressional and/or shear stresses, that are exerted on the set cement. Wellbore cements may be subjected to shear and compressional stresses that result from a variety of causes. For example, stress conditions may be induced by relatively high temperatures and/or relatively high fluid pressures encountered inside cemented wellbore pipe strings during operations such as perforating, stimulation, injection, testing, production, etc. Stress conditions may also be induced or aggravated by fluctuations or cycling in temperature or fluid pressures during similar operations. Variations in temperature and internal pressure of the wellbore pipe string may result in radial and longitudinal pipe expansion and/or contraction which tends to place stress on, among other things, the annular cement sheath existing between the outside surface of a pipe string and the inside formation surface or wall of a wellbore. Such stresses may also be induced in cement present in other areas of the wellbore in the pipe.

In other cases, cements placed in wellbores may be subjected to mechanical stress induced by vibrations and impacts resulting from operations, for example, in which wireline and pipe conveyed assembly are moved within the wellbore. Hydraulic, thermal and mechanical stresses may also be induced from forces and changes in forces existing outside the cement sheath surrounding a pipe string. For example, overburden and formation pressures, formation temperatures, formation shifting, etc. may cause stress on cement within a wellbore.

Conventional wellbore cements typically react to excessive stress by failing. As used herein, "cement failure" means cracking, shattering, debonding from attached surfaces (such as exterior surfaces of a pipe string and/or the wellbore face), or otherwise losing its original properties of strength and/or cohesion. Stress-induced cement failure typically results in loss of formation isolation and/or wellbore mechanical integrity. This in turn may result in loss of production, loss of the wellbore, pollution, and/or hazardous conditions.

Although hydraulic, thermal and/or mechanical induced stresses may be encountered in all types of wells, including those having conventional vertical wellbores, such stresses may be more likely to occur in particular types of completion configurations. For example, completions having relatively thin annular cement sheaths between pipe strings and/or between the outside surface of a pipe string and the inside formation wall may be particularly susceptible to stress-induced cement damage. Such thin cement sheaths may be encountered, for example, in conditions where open hole wellbore size is limited, yet a cemented pipe string diameter must be maximized. Examples include, but are not limited to, those cases where full length or stub liners are cemented, for example, to isolate casing damage and/or substantially eliminate formation pressure and/or fluid communication.

In other cases, a main or primary wellbore may have one or more secondary wellbores extending laterally therefrom to form a lateral or multi-lateral completion. In such cases, a primary wellbore may be vertical or deviated (including horizontal), and one or more secondary lateral wells are drilled from the primary wellbore after it has been cased and cemented. Each of the secondary lateral wellbores may be vertical or deviated, and may optionally include a cemented liner which may be tied into the primary wellbore. In this regard, secondary lateral wellbores may be drilled from a primary wellbore initially, and/or at any other time during the life of the well. Such lateral or multi-lateral completions may be particularly susceptible to stress induced cement failures for a number of reasons. For example, the juncture between the primary and secondary lateral wellbores is typically exposed to mechanical stresses induced by a large number of subsequent operations involving the running of tools through the junction point. The number of operations and exposure to stress typically increases with the number of secondary lateral wellbores extending from the primary wellbore. Furthermore, the magnitude of mechanical stress from a given operation typically increases with the angle of deviation between the axis of the primary wellbore and the a given secondary lateral wellbore.

When conventional cements are employed in lateral or multi-lateral wellbore completions, the set conventional cement is typically too brittle to withstand shocks and impacts generated by drilling and other well operations performed in the secondary lateral wellbores. Therefore, in such completions, conventional set cement compositions typically fail by shattering or cracking, resulting in loss of isolation and mechanical integrity. Potential for such stress-induced cement failure typically increases, for example, in those situations in which the internal diameter of a cased secondary lateral wellbore is designed to be as close as possible to the internal diameter of the cased primary wellbore. This is typically done for ease of drilling and completion, but results in a cement sheath having a reduced thickness, and therefore which is more susceptible to damage.

Similar cement failure problems may be encountered in single wellbores having relatively thin cement sheaths (such as "slimhole" completions), and/or other configurations which cause an increase in the magnitude of frequency of mechanical stresses including, but not limited to, wellbores having deviations or doglegs at which mechanical impact may be concentrated. Examples of such wellbores include, but are not limited to, highly deviated or horizontal completions, and/or sidetracked wellbores.

In other cases, injection or production of high temperature fluids may cause thermal expansion of trapped fluids located, for example, between a pipe string and a cement sheath, between a cement sheath and the formation, and/or within the cement sheath. Such trapped fluids may create excessive pressure differentials when heated and/or cooled, resulting in cement failure. Thermal cycling (such as created by intermittent injection or production of fluids that are very warm or cool relative to the formation temperature), typically increase the likelihood of cement failure.

In still other cases, mechanical and/or hydraulic forces exerted on the exterior of a cement sheath may cause stress-induced cement failure. Such forces include, but are not limited to, overburden pressures, formation shifting, and/or exposure to overpressured fluids within a formation. Increased pressure differential, such as may be caused when the interior of a cemented pipe string is partially or completely evacuated of liquid, also tends to promote cement failure, especially when combined with relatively high pressures exerted on the exterior of a cement sheath surrounding the cemented pipe string.

In addition, any type of thermal, mechanical or hydraulic stress that acts directly on a set cement composition, or which tends to cause deformation of a wellbore tubular in contact with a set cement composition may promote, or result in, failure of a conventional cement composition.

Furthermore, types of cement configurations that may be adversely affected by stresses, such as those discussed above, include not only annular cement sheaths placed by circulation, but also include cement compositions introduced into a wellbore by a variety of other methods. Such other methods include those employed during or after completion, for example, as part of remedial, workover or abandonment operations. Specific examples include, but not limited to, cement placed by squeezing or spotting, to for example, seal off perforations or casing leaks. Presence of high perforation densities may also contribute to cement failure before or after perforation, by explosive force and/or by mechanically weakening a pipe string or tubular so that it is more susceptible to deformation by stress. Such cement configurations may be particularly susceptible to mechanical damage.

SUMMARY OF THE INVENTION

Stress resistant cementing systems and methods are provided in which cement slurries may be formulated to provide hardened cement compositions possessing relatively high resilience, elasticity, and/or ductility. As used herein, a "hardened cement composition" means a cured or set cement slurry composition. Such cement formulations may be used to cement wellbores where high stress resistance is required. These include wells in which high stress conditions exist or in which cement will be subjected to conditions of high stress including, but not limited to, those types of wellbores discussed above. Specific examples of such wells include, but are not limited to, wells having slimhole completions, highly deviated or horizontal wells, wells exposed to thermal and/or pressure cycling, high perforation density completions, wells completed in formations subject to relatively high overburden and/or fluid pressures, and wells having junction points between a primary wellbore and one or more lateral wellbores. Such cement systems are typically characterized by the ability to provide the ductility needed to withstand impacts and shocks of well operations and/or stresses induced by temperature and/or fluid production/injection, while at the same time providing relatively high compressive strength.

As disclosed herein, a typical stress resistant cementing system may comprise a hydraulic cement, water, and at least one of fibrous material such as wollastonite (a fibrous calcium silicate material), an aluminum silicate (such as a metakaolin), or a mixture thereof. Other cementing additives including, but not limited to, fibers, fluid loss additives, set retarders, dispersants, etc. may also be optionally employed.

In one respect, this invention is a method of cementing within a wellbore, including the steps of introducing a cement slurry composition including a Portland cement and fibrous mineral into a wellbore, and allowing the cement composition to set within the wellbore. In this method, the fibrous mineral may include at least one of wollastonite, sillimanite, sepiolite, pyrophyllite, or a mixture thereof. More typically, the fibrous mineral includes wollastonite.

In another respect, this invention is a method of cementing within a wellbore where the cement will be subjected to conditions of high stress within the wellbore. The method includes the steps of introducing a cement slurry composition including a hydraulic cement base and at least one of aluminum silicate, a fibrous mineral, or a mixture thereof into the wellbore, and allowing the cement composition to set within the wellbore to form a hardened cement composition within the wellbore. The method may also include the step of introducing the cement composition into an annulus existing between a pipe and the wellbore in which a theoretical annular clearance between the outside surface of the pipe and the interior surface of the wellbore is less than about 0.5 inches. In this method, the wellbore may also include a primary wellbore and one or more secondary lateral wellbores, and the step of introducing may further include introducing the cement composition into an annulus existing between a pipe and at least one of the one or more secondary lateral wellbores. In this method, at least a portion of the wellbore may be horizontal or highly deviated. In one embodiment of this method, the cement composition may include between about 1% and about 75% of aluminum silicate BWOC. In another embodiment, the cement composition may include between about 1% and about 75% of fibrous mineral BWOC. In this method, the cement composition may further include consolidating fibers, such as nylon or polypropylene fibers. The method may also further include the step of allowing the cement composition to set to form a hardened cement composition having a tensile strength of at least about 10% greater than the tensile strength of a conventional neat cement design containing the same base hydraulic cement type; having a flexural strength of at least about 10% greater than the flexural strength of a conventional neat cement design containing the same base hydraulic cement type; and having a compressive strength of at least about 10% greater than the compressive strength of a conventional neat cement design containing the same base hydraulic cement type. In one embodiment of this method, the hydraulic cement base includes Class G or Class H Portland cement; and the step of allowing further includes the step of allowing the cement composition to set to form a hardened cement composition having a tensile strength of greater than about 300 psi, a flexural strength of greater than about 1200 psi, and a compressive strength of greater than about 4000 psi. In another embodiment of this method, the step of allowing further includes the step of allowing the cement composition to set to form a hardened cement composition capable of withstanding a greater level of wellbore stress without failing than a hardened cement composition including the hydraulic cement without the aluminum silicate or the fibrous mineral. In this method, the aluminum silicate may include at least one of kaolin, metakaolin, halloysite, dickite, nacrite, or a mixture thereof, and most typically includes metakaolin. In this method, the fibrous mineral includes at least one of wollastonite, sillimanite, sepiolite, pyrophyllite, or a mixture thereof, and most typically includes wollastonite.

In another respect, this invention is a method of cementing within a wellbore, including the steps of introducing a cement slurry composition including a hydraulic cement and at least one of metakaolin, wollastonite, or a mixture thereof into the wellbore; and allowing the cement composition to set within the wellbore to form a hardened cement composition within the wellbore. In this method, at least one or all of the following conditions may exist: 1) the cement composition may be introduced into an annulus existing between a pipe and the wellbore in which a theoretical annular clearance between the outside surface of the pipe and the interior surface of the wellbore is less than about 0.5 inches; 2) the cement composition may be introduced into a wellbore that includes a primary wellbore and one or more secondary lateral wellbores, and in which the step of introducing further includes introducing the cement composition into an annulus existing between a pipe and at least one of the one or more secondary lateral wellbores; or 3) the cement composition may be introduced into a well in which at least a portion of the wellbore is horizontal or highly deviated. In one embodiment of this method, the cement composition may include between about 1% and about 75% of metakaolin BWOC. In another embodiment of this method, the cement composition may include between about 1% and about 75% of wollastonite BWOC. The cement composition may also include consolidating fibers. In one embodiment, the cement composition may be allowed to set to form a hardened cement composition having a tensile strength of at least about 10% greater than the tensile strength of a conventional neat cement design containing the same base hydraulic cement type; having a flexural strength of at least about 10% greater than the flexural strength of a conventional neat cement design containing the same base hydraulic cement type; and having a compressive strength of at least about 10% greater than the compressive strength of a conventional neat cement design containing the same base hydraulic cement type. In this method, the hydraulic cement base may include Class G or Class H Portland cement, and the cement composition may be allowed to set to form a hardened cement composition having a tensile strength of greater than about 300 psi, a flexural strength of greater than about 1200 psi, and a compressive strength of greater than about 4000 psi. The cement composition may be allowed to set to form a hardened cement composition capable of withstanding a greater level of wellbore stress without failing than a hardened cement composition including the hydraulic cement without the metakaolinite or the wollastonite.

DESCRIPTION OF ILLUSTRATIVE EMBODIMENTS

The disclosed stress resistant cement systems may contain aluminum silicate and/or fibrous materials such as wollastonite. These cementing systems are useful for, among other things, cementing operations performed in wellbores having conditions prone to stress-induced cement failure. As used herein "wellbore stress" includes compressive, tensile and/or shear stresses (such as from shifting formations) that may be experienced by a hardened cement slurry in a well or wellbore. Such wellbore stress conditions include those described elsewhere herein. In particular, the disclosed cement systems are useful in cementing operations performed in wellbores subject to mechanical, hydraulic and/or thermally induced stresses. Although benefits of the disclosed cement compositions and systems may be realized in any type of well cementing situation, these compositions are particularly suitable for use in wells in which conditions of high stress are present or in which cement will be subjected to conditions of high stress including, but not limited to, lateral completions, multi-lateral completions, horizontal wellbores, wellbores for conducting relatively high temperature and/or high pressure fluids, wellbores subjected to high overburden stress or formation shifting, deviated or horizontal wells, wells having one or more doglegs or sidetrack segments, slimhole completions, wells exposed to thermal and/or pressure cycling, wellbores having relatively high perforation densities, etc.

In one embodiment, the disclosed stress resistant cement compositions may be utilized to cement one or more secondary lateral wellbores extending from a primary wellbore. A secondary lateral wellbore may be a single lateral wellbore extending from a primary wellbore, or one of multiple secondary lateral wellbores extending from a primary wellbore. Secondary lateral wellbores may connect to and extend from primary wellbore in any manner known to those of skill in the art. For example, one or more secondary lateral wellbores may be drilled in parallel relationship through the bottom of a primary wellbore and then spread out in separate directions. Alternatively, one or more lateral wellbores may be drilled through pre-existing windows located in a liner or casing placed in the primary wellbore. In this regard, windows in the primary wellbore liner or casing may be pre-existing (such as present in a liner run during the original completion of the primary wellbore), or alternatively may be cut or milled into the sides of a liner or casing already present in a primary wellbore. In either case, where more than one secondary lateral wellbore is present, the wellbores may extend through windows cut at varying depths within the primary wellbore if desired. Advantageously, the disclosed stress resistant cement compositions may be utilized to cement partial or complete liners in place within a secondary lateral wellbore in order to create a stress resistant hydraulic seal at the junction point between the lateral wellbore and the window in the primary wellbore. Further information about lateral and multi-lateral completions may be found in Hogg, "Comparison of Multilateral Completion Scenarios and Their Application," SPE 38493, pp. 17–27, Sep. 9–12, 1997, which is incorporated by reference herein.

Figures 1, 2:
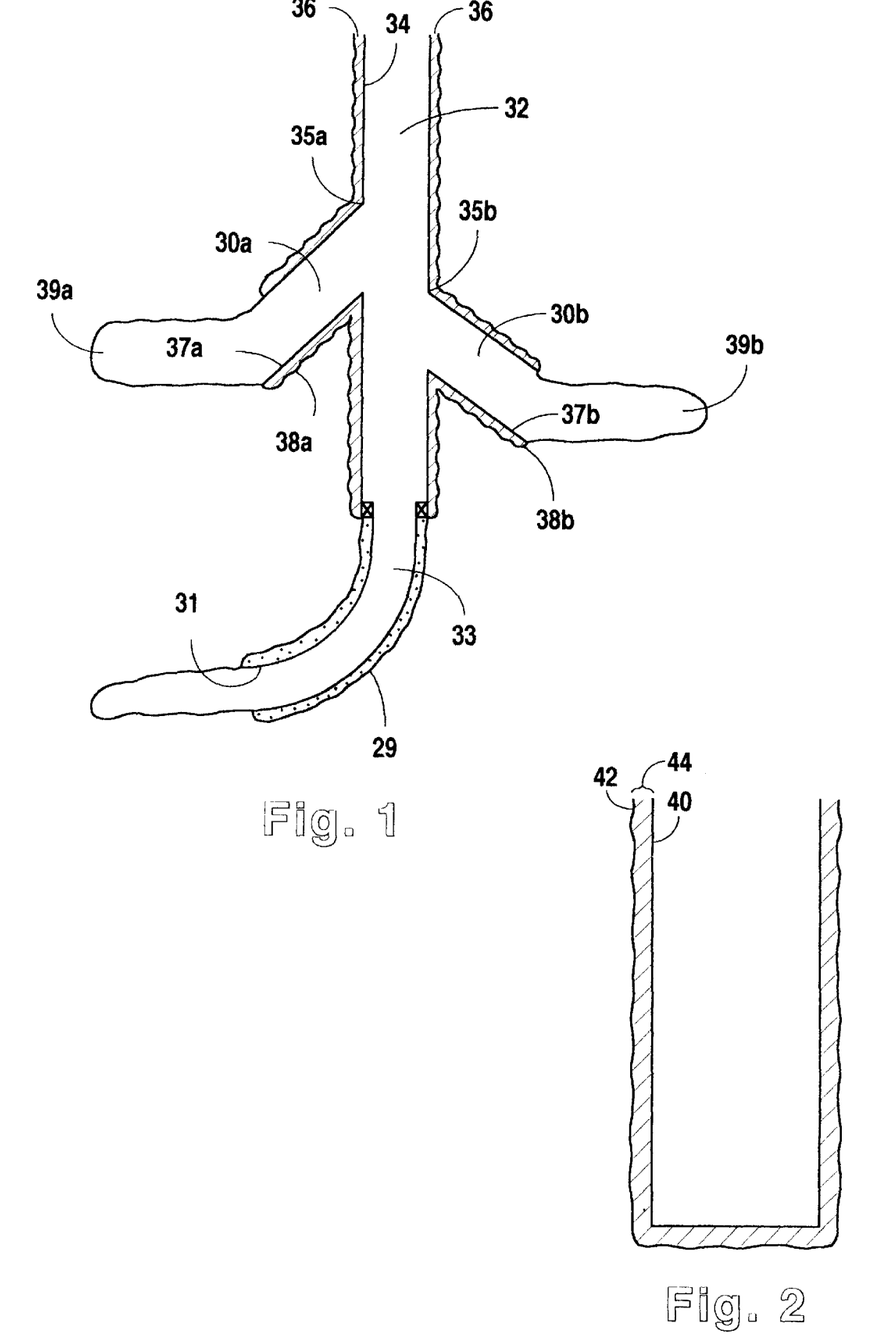
FIG. 1 is a simplified cross-sectional view of a multi-lateral completion including a primary wellbore and multiple secondary wellbores.
FIG. 2 is a simplified cross-sectional view of a casing string surrounded by cement and suspended in a wellbore.

FIG. 1 illustrates just one of many possible multi-lateral well configurations. As shown in FIG. 1, a secondary lateral wellbore may be one of multiple secondary lateral wellbores extending from a primary wellbore. In the embodiment of FIG. 1, primary wellbore 32 typically includes casing 34 surrounded by annular cement sheath 36. Two secondary lateral wellbores 30a and 30b connect to primary wellbore 32 at junction points 35a and 35b, and have respective cemented lateral liners 37a and 37b surrounded by annular cement sheaths 38a and 38b. Open hole areas 39a and 39b may be optionally provided. As may be seen in FIG. 1 should the cement fail, for example, at upper junction point 35a, pieces of failed cement may fall into the wellbore on top of completion assemblies located downhole, such as tubing and/or packers associated with selective completions in downhole wellbores 30b and 33, potentially sticking the assemblies in the hole, or may otherwise interfere with production.

In another embodiment, the disclosed stress resistant cement compositions may be used to cement deviated or highly deviated wells in which mechanical stresses may be exacerbated by the action of wireline or pipe conveyed well assemblies moving within the wellbore. An example of a highly deviated wellbore section 33 having a cemented liner 31 and surrounding annular cement sheath 29 is also shown in FIG. 1. Although benefits of the disclosed cement compositions may be realized in wellbores having any angle of deviation between about 0° and about 90° with respect to the vertical, these cement compositions are particularly advantageously employed in horizontal wells, or in highly deviated wells which may be described as those wells in which at least a portion of the wellbore has an angle of deviation with respect to the vertical of greater than about 30°, more typically between about 30° and about 90°, most typically between about 75° and about 90°. It will be understood with benefit of this disclosure that the disclosed cement compositions may be advantageously employed in highly deviated wells having an angle of deviation greater than about 90°.

In still another embodiment, the disclosed stress resistant cement compositions may be advantageously employed in the cementing of slimhole completions, as illustrated in FIG. 2. As used herein, a slimhole completion refers to a completion in which the theoretical annular clearance 44 between the outside surface of a pipe string body (such as a casing or liner) 40 and the wellbore wall or formation face 42 is less than about ½ inches, more typically less than about ⅜ inches. As an example, a theoretical annular clearance of about 0.31 inches exists between the outside diameter of a 4.5 inch outside diameter (od) pipe string centralized within a 5⅛ inch inside diameter (id) wellbore. As used herein, "theoretical annular clearance" may be obtained by calculating the annular clearance 44 between the outside surface of a pipe string 40 and the inside surface or formation face 42 of a wellbore, assuming the pipe string 40 is centralized within the openhole wellbore. However, it will be understood with the benefit of this disclosure that benefits of the disclosed stress resistant cement compositions may be realized whether or not a pipe string is actually centralized within the openhole of the wellbore at any given point. Therefore, benefits may be obtained whether a pipe string is completely centralized, partially centralized or not centralized at all. Furthermore benefits may also be obtained in wellbores having theoretical annular clearances of greater than or equal to about ½ inches including, but not limited to those having theoretical annular clearances of less than or equal to about 3 inches, in other cases less than or equal to about 2 inches, in other cases less than or equal to about 1 inch.

In another embodiment, the disclosed stress resistant cement compositions may be employed in wells exposed to high temperatures. These include, but are not limited to, wells completed in deep and/or high temperature formations with high temperature fluids, wells used in geothermal applications, wells used in injection schemes where high temperature fluids are injected into a formation (such as steam floods), and wells used for producing relatively high temperature fluids (such as fire floods). Stresses on cement in such wells may be aggravated where cement is placed in a well and cured at relatively lower or conventional temperatures (for example, about 100° F. to about 200° F. bottom hole circulating temperature). High temperatures and thermal cycling tend to induce stress on set cement by causing, among other things, linear and radial expansion and/or contraction of wellbore tubulars. In such cases, the disclosed cement compositions may be particularly advantageously employed in wellbores having static bottom hole temperatures greater than about 300° F., more advantageously employed in wellbores having static bottom hole temperatures of greater than about 350° F., and even more advantageously employed in wellbores having static bottom hole typically greater than about 400° F., although the compositions may be beneficially employed in wells having static bottom hole temperatures less than or equal to about 300° F. as well.

In another embodiment, the disclosed compositions may be employed in wellbores in which thermal cycling occurs. By "thermal cycling" it is meant that a given point of a wellbore is subjected to relatively large magnitude changes or swings in temperature, such as may be encountered during intermittent injection or production of relatively high temperature or low temperature fluids. In this regard, the disclosed cement compositions may be particularly advantageously employed in wells in which at least a portion of the wellbore is subjected to recurrent or cyclic temperature changes of greater than about 100° F., more advantageously employed in wells in which at least a portion of the wellbore is subjected to recurrent or cyclic temperature changes of greater than about 150° F., and most advantageously employed in wells in which at least a portion of the wellbore is subjected to recurrent or cyclic temperature changes of greater than about 200° F., although the compositions may be beneficially employed in wells having cyclic temperature changes of equal to or less than about 100° F. as well.

In another embodiment, benefits of the disclosed stress resistant cement compositions may be realized in any well in which a high pressure differential exists between the interior of the pipe string and the wellbore face, or in which pressure cycling or pressure swings occur. Examples of such situations include those in which relatively high pressure well stimulation treatments (such as hydraulic fracturing treatments) are performed, or in which high temperature production operations cause relatively high annular pressures to develop. In other cases, such conditions may exist where wellbores penetrate overpressured formations, and/or in which a wellbore may be partially or completely evacuated during completion or production or later operations. In any event, the disclosed stress-resistant cement compositions may be particularly advantageously employed when used in wellbores in which a pressure differential of greater than about 2000 psi exists between the interior of the pipe string and the wellbore face, more advantageously employed when used in wellbores in which a pressure differential of greater than about 3500 psi exists between the interior of the pipe string and the wellbore face, and most advantageously employed when used in wellbores in which a pressure differential of greater than about 5000 psi exists between the interior of the pipe string and the wellbore face, although benefits may also be realized at pressure differentials equal to or less than about 2000 psi as well. The effects of such high pressure differentials may be further exacerbated by cycling of the pressure, such as may be encountered when periodic high pressure well treatments are performed. In this regard, the disclosed cement compositions may be particularly advantageously employed in wellbores subjected to recurrent or cyclic pressure changes of greater than about 1000 psi, more advantageously employed in wellbores subjected to recurrent or cyclic pressure changes of greater than about 2000 psi, and most advantageously employed in wellbores subjected to recurrent or cyclic pressure changes of greater than about 3000 psi, although the compositions may be beneficially employed in wells having cyclic pressure changes equal to or less than about 1000 psi in magnitude as well.

In another embodiment, the disclosed stress resistant cement compositions may be employed in wellbores in which relatively high perforation densities exist or are contemplated. As used herein, "high perforation density" includes completions in which a liner, casing, or other pipe string is perforated at a density of greater than about 4 shots per foot (spf), more typically greater than about 6 spf, more typically greater than about 8 spf, and most typically greater than about 10 spf. Such relatively high perforation densities tend to increase the stress on a cement sheath by subjecting the casing and surrounding cement sheath to the shock of a large number of closely spaced perforating charges. In many cases, such high density perforations require several perforating runs, thus subjecting the casing and surrounding cement sheath to multiple high explosive shock events. In either case, the risk of damage to the cement sheath and loss of cement integrity is increased. Furthermore, high density perforations tend to weaken pipe strings and/or expose larger amounts of the annular cement sheath to the interior of a pipe string, thus increasing the stress on the set cement.

The disclosed stress resistant cement compositions may be particularly advantageous for cementing performed within wellbores having combinations of stress-inducing factors, for example, in wellbores having combinations of characteristics of more than one of the above-described embodiments (or in combination with other stress-inducing factors). For example, relatively high angles of deviation as described above may be present in combination with another stress-inducing factor, such as slimhole well and/or lateral well configuration. In such a case, set cement present within secondary lateral wellbores may be subjected to stresses resulting from both the angle of wellbore deviation and the presence of a secondary/primary wellbore junction point. Other stress-inducing factors may also be present, including slimhole well configuration and/or abrupt wellbore angle changes, such as encountered in doglegged or sidetracked completions. For example, a secondary lateral wellbore may be a slimhole completion having a cement sheath with a theoretical annular clearance of less than about 0.5 inches. Furthermore such secondary lateral wellbores may be completed with high density perforations and/or subjected to high pressure well treatments, such as hydraulic fracturing. Therefore, the combination of these characteristics increases the risk of stress-induced cement failure, and therefore increases the benefits that may be realized by cementing such a wellbore with the disclosed aluminum silicate and/or wollastonite-containing cement.

The preceding embodiments represent only a few of the many wellbore situations in which well cements may be subjected to relatively high mechanical, thermal or hydraulic induced stresses. In this regard, they are exemplary only. It will therefore be understood that benefits of the disclosed stress resistant cement compositions may be realized in any wellbore cementing application in which a cured or set cement is subjected to relatively high mechanical, thermal or hydraulic stresses. Such wellbore situations include, but are not limited to, annular cement sheaths existing between pipe strings (such as a liner cemented within another string of casing), expandable packers inflated with cement, and/or cement employed to repair casing damage or isolate perforations (such as squeeze cementing). Other examples of wellbore cementing in which high stresses may be encountered include, but are not limited to, cement plugbacks (especially where high pressure differentials and/or mechanical shocks are encountered). Further information on sources and causes of stress that may be induced in wellbore cements may be found in Thiercelin et al., "Cement Design Based on Cement Mechanical Response", SPE Paper 38598, pp. 1–23, Oct. 5–8, 1997, which is incorporated herein by reference.

The disclosed stress resistant cement compositions may comprise aluminum silicate and/or fibrous minerals, and offer may be used to provide set cement compositions having improved resilience, elasticity, and/or ductility. Surprisingly, the addition of aluminum silicate (such as metakaolin) and/or fibrous minerals (such as wollastonite), has been found to improve the flexural strength and resilience of hydraulic cements without significantly altering their compressive strengths, and in many cases may improve compressive strength. Comparisons between the disclosed aluminum silicate and/or fibrous mineral-containing cement systems of the disclosed method and other cement systems containing various additives (such as nylon fibers, styrene butadiene resin and polyvinyl alcohol-based fluid loss additive) may be found in Example 1. As shown in Example 1, embodiments of the disclosed aluminum silicate and/or fibrous mineral-containing cement compositions offer set or cured cement compositions having impressive flexural, compressive and tensile strength advantages over previous cements. Advantageously, these properties produce the opportunity for stress induced cement failure, therefore reducing the risks associated therewith, including the potential for loss of production, pollution, loss of wellbore, etc.

A typical stress resistant cement composition containing a hydraulic cement base as described herein, and one or more of the aluminum silicates or fibrous minerals as disclosed herein, may be used to produce a set cement composition exhibiting a tensile strength of about 10% greater, in some cases of about 15% greater, and in some cases of about 30% greater than the tensile strength of a conventional neat cement design containing the same base hydraulic cement type. Similarly, such a typical stress resistant cement composition may be used to produce a set cement composition exhibiting a flexural strength of about 10% greater, in some cases of about 20% greater, in some cases of about 30% greater, in some cases of about 40% greater, in some cases of about 50% greater, in some cases of about 60% greater, and in some cases of about 70% greater than the flexural strength of a conventional neat cement design containing the same base hydraulic cement type. Similarly, such a typical stress resistant cement composition may be used to produce a set cement composition exhibiting a compressive strength of about 10% greater, in some cases of about 15% greater, and in some cases of about 20% greater than the flexural strength of a conventional neat cement design containing the same base hydraulic cement type. It will be understood with benefit of this disclosure that for any given hydraulic embodiment of the disclosed stress resistant cement compositions, that one or all of the respective tensile, compressive, and flexural strength values of the set cement may vary independently and/or may be less than the strength values given above, or alternatively may all be greater than the values given above. Further information on advantages of increased tensile strength, flexural strength and/or compressive strength in relation to stresses encountered in cemented wellbores may be found in Thiercelin et al., "Cement Design Based on Cement Mechanical Response," SPE Paper 38598, pp. 1–23, Oct. 5–8, 1997), which has been incorporated herein by reference.

For example, in one embodiment a typical stress resistant cement composition containing an API Class G or H hydraulic cement base, and one or more of the aluminum silicates or fibrous minerals disclosed herein, produces in some cases a set cement composition exhibiting a tensile strength of greater than about 300 psi, in some cases greater than about 450 psi, and in some cases greater than about 600 psi, although tensile strengths less than or equal to about 300 psi are also possible. Similarly, in one embodiment a stress resistant cement composition containing an API Class G or H hydraulic cement base, and one or more of the aluminum silicates or fibrous minerals disclosed herein, produces a set cement composition exhibiting a flexural strength of greater than about 1200 psi, in some cases greater than about 1400 psi, and in some cases greater than about 1600 psi, although flexural strengths less than or equal to about 1200 psi are also possible. Similarly, in one embodiment a typical stress resistant cement composition containing an API Class G or H hydraulic cement base, and one or more of the aluminum silicates or fibrous minerals disclosed herein, produces in some cases a set cement composition exhibiting a compressive strength of greater than about 4000 psi, in some cases greater than about 5000 psi, and in some cases greater than about 6000 psi, although compressive strengths less than or equal to about 4000 psi are also possible. It will be understood with benefit of this disclosure that for any given API Class G or Class H embodiment of the disclosed stress resistant cement compositions, that one or all of the respective tensile, compressive, and flexural strength values of the set cement may vary independently and/or may be less than the strength values given above, or alternatively may all be greater than the values given above.

In the practice of the disclosed method and compositions, aluminum silicate and/or fibrous minerals may be combined with a suitable hydraulic cement or mixture of hydraulic cements and an aqueous base fluid to form a cementing slurry. In this regard, any hydraulic cement or mixture of hydraulic cements suitable for wellbore cementing and compatible with aluminum silicate and/or fibrous mineral may be employed. Typically, hydraulic cement type is selected based on downhole conditions, such as temperature, using methods known in the art. Examples of suitable hydraulic cement types include, but are not limited to, known hardenable cementitious materials comprising, for example, aluminum, silicon, calcium, oxygen, sulfur or mixtures thereof. More specifically, suitable hydraulic cements include gypsum cements, silica cements, high aluminum content cements, blast furnace slag-based cements, pozzolona type cements, Portland cements, high alkalinity cements, etc. These hydraulic cements may be used alone or in mixtures. Portland cements are often employed. Typical Portland cements include, but are not limited to, ASTM Type I, II, III, IV and/or V Portland cements, and API Class A, B, C, G and/or H Portland cements. However, it will be understood with benefit of this disclosure that other cements and cements containing other additives may also be suitably employed, including those described elsewhere herein. In this regard, a suitable hydraulic cement type or mixture of hydraulic cement types may be selected based on anticipated downhole conditions, such as temperature, with benefit of this disclosure using methods known in the art.

In the practice of the disclosed method, aluminum silicate and/or fibrous minerals may be mixed or otherwise combined with a hydraulic cement, water, and/or other desired additives in any order suitable for forming a stress resistant cement slurry. A suitable hydraulic cement may be mixed with various admixtures including, but not limited to, pozzolan, blast furnace slag, hollow microspheres, nitrogen, and mixtures thereof.

In the practice of one embodiment of the disclosed method stress resistant cement composition typically contains a mixture of aluminum silicate and a suitable hydraulic cement such as described elsewhere herein. In this regard, any aluminum silicate composition suitable for mixture with a hydraulic cement, and more typically, suitable for increasing the resiliency, elasticity, and/or ductility of a set cement composition, may be employed. In one typical embodiment, aluminum silicate is typically comprised of $SiO_2/Al_2O_3/Fe_2O_3$. Most typically an aluminum silicate is kaolin or kaolinite, calcined kaolin or kaolinite (metakaolin), or mixtures thereof. Such aluminum silicate may also be referred to as China Clay. Other suitable forms of aluminum silicate include, but are not limited to, halloysite, dickite, and nacrite, and mixtures thereof, as well as mixtures of these with materials with kaolin and/or metakaolin.

Further information on suitable aluminum silicates may be found in "Textbook of Lithology" by Jackson, K. C., 1970, McGraw-Hill, Library of Congress No. 72-95810 which is incorporated herein by reference. As explained in this reference, in one embodiment kaolins structurally may consist of a sheet of silicon-oxygen tetrahedra coordinated with a sheet of aluminum-oxygen-hydroxide octahedra. The resultant double sheet is typically electrostatically neutral so that no additional ions are required. The various minerals of the group may differ in the stacking patterns of these double sheets. Other information on suitable aluminum silicates may be found in the United States patent application entitled "Method and Compositions for Use in Cementing" by Virgilio G. Boncan et al., filed Dec. 12, 1997, which is incorporated herein by reference in its entirety.

In the practice of one embodiment of the disclosed method, the content of silica is typically between about 75% and about 25%, more typically between about 65% and about 52% by weight, and the content of alumina is typically between about 25% and about 75%, more typically between about 35% and about 48% by weight respectively, although other silica and alumina contents are possible, including silica contents greater than about 75% and less than about 25% by weight, and alumina contents less than about 25% and greater than about 75% by weight. Aluminum silicates may contain trace amounts of ferric oxide. In this regard, any ferric oxide fraction present is typically present in an amount less than about 1% by weight of aluminum silicate, although fractions greater than about 1% are also possible.

Typically, in the practice of the disclosed method, aluminum silicate has a particle size of between about 0.5 $\mu$M and about 2 $\mu$M and a specific gravity of greater than or equal to 2.2, and most typically about 2.5, although sizes and specific gravities outside these ranges are also possible. In this regard, smaller or more fine particles of aluminum silicate may be useful in situations requiring greater reactivity.

In the formulation and use of the various cement composition embodiments disclosed herein, any type of aluminum silicate suitable for obtaining the desired properties of each embodiment under individual well conditions may be employed. Typically, the disclosed aluminum silicate-containing cement slurries are formed using aluminum silicate in the form of kaolin or calcined anhydrous kaolin (metakaolin), and most typically in the form of metakaolin. Such metakaolin aluminum silicates include, but are not limited to, those commercially available as "METAMAX" and, in finer form, as "METAMAX EF", both available from Engelhard Corporation, Specialty Minerals and Colors of Iselin, N.J. "METAMAX" may be characterized as calcined anhydrous Kaolin $Al_2O_3 \cdot SiO_2$, and has an average particle size of about 1.5 $\mu$M, is composed of 97% $SiO_2+Al_2O_3+Fe_2O_3$, has a 97% Na minimum with a specific gravity of about 2.5, a maximum wet screen residue of about 0.35% at +325 mesh, a pH of about 4.5–6.5, a maximum free moisture content of about 1.0, a loose bulk density of about 18 lbs/ft$^3$, a tamped bulk density of about 32 lbs/ft$^3$, and a specific gravity of about 2.5. In comparison, "METAMAX EF" has an average particle size of about 0.5 $\mu$M, is composed of 98% $SiO_2+Al_2O_3+Fe_2O_3$, and has a specific gravity of about 2.5, with a similar pH and free moisture content as "METAMAX." It will be understood with benefit of this disclosure that "METAMAX" and "METAMAX EF" are merely given as specific examples of suitable aluminum silicates, and that other aluminum silicates may be employed as well.

Metakaolins such as "METAMAX" and "METAMAX EF" may be employed interchangeably or in mixtures under a wide variety of well cementing conditions. However, "METAMAX EF" may be optionally selected for use under conditions where greater reactivity is desired, such as under relatively cooler conditions (e.g., where bottomhole circulating temperatures of less than about 60° F. exist). In contrast, "METAMAX" may be optionally selected for use under conditions where reactivity is not as great of a concern, such as under relatively warmer conditions (e.g., where bottomhole circulating temperatures of greater than or equal to about 60° F. exist). In this regard, selection of desired aluminum silicate form may be made with the benefit of this disclosure to obtain desired cement and cement slurry properties.

In addition to those aluminum silicates mentioned elsewhere herein, it will be understood with the benefit of the disclosure that any other suitable aluminum silicates may be employed. Examples of other suitable aluminum silicates include, but are not limited to, halloysite, dickite, and nacrite. It will also be understood with benefit of this disclosure that mixtures of suitable aluminum silicates may also be employed.

Suitable fibrous minerals for use in the disclosed method and compositions may include, but are not limited to, carbonate or silicate minerals having a fibrous, aggregate crystal structure. The term "silicate" as used herein refers to those compounds containing silicon, oxygen, and one or more metals. Specific examples of suitable fibrous minerals include wollastonite, brucite, trona, sillimanite, sepiolite and pyrophyllite. Specific examples of suitable fibrous silicate minerals include wollastonite, sillimanite, sepiolite and pyrophyllite. Further information on fibrous minerals may be found in U.S. Pat. No. 5,421,409, which is incorporated by reference herein in its entirety.

A fibrous mineral-containing cement slurry typically contains a mixture of fibrous mineral in a suitable hydraulic cement such as described elsewhere herein. In this regard, any fibrous mineral suitable for mixture with a hydraulic cement, and more typically, suitable for increasing tensile strength, flexural strength, and/or compressive strength of a cured cement composition may be employed. Most typically, wollastonite is employed. Wollastonite is a natural occurring calcium metasilicate mineral which may be found, for example, in metamorphic rock formations in New York and California. Wollastonite is an acicular fiber which tends to form a fibrous, crystalline structure in its aggregate or polycrystalline form. Wollastonite is typically available as very fine or micro-fibers having diameters similar to that of particles of cement (typically from about 25 to about 40 $\mu$m) and a fiber length of typically from about 0.4 to about 0.6 mm. Wollastonite fibers typically are available in the shape of a acicular particles.

In the formulation and use of the various cement composition and embodiments disclosed herein, any specific type of wollastonite suitable for obtaining the desired properties of each embodiment under individual well conditions may be employed. Suitable wollastonites include, but are not limited to, wollastonite commercially available as "VANSIL W-10", available from R.T. Vanderbilt Company of Norwalk, Connecticut. "VANSIL W-10"may be characterized as acicular shaped micro fibers having fiber lengths of about 0.4–0.6 mm and fiber diameters of about 25–40 $\mu$m, is composed of calcium silicate, having the characteristic of 97.3% passing through a 200 mesh screen, a pH of about 10, and a specific gravity of about 2.9. Other suitable wollastonites include, but are not limited to, wollastonite available as NYAD G grade from Prescott & Co. of Mississauga, Ontario, Canada. In one embodiment a wollastonite having between about 40% and about 55% CaO and between about 60% and about 45% $SiO_2$, and more typically having about 44% CaO and about 50% $SiO_2$ may be employed, although it will be understood with benefit of this disclosure that wollastonites having less than about 40% or greater than about 55% CaO, and having greater than about 60% or less than about 45% $SiO_2$ may be employed as well.

In addition to those fibrous minerals mentioned elsewhere herein, it will be understood with the benefit of the disclosure that any other suitable fibrous minerals may be employed. It will also be understood with benefit of this disclosure that mixtures of suitable fibrous minerals may also be employed. Furthermore, mixtures of aluminum silicate and fibrous minerals by weight may also be employed. In such embodiments, any suitable ratio of aluminum silicate to fibrous mineral may be used. However, the ratio of aluminum silicate to fibrous mineral is typically from about 4:1 to about 1:4, more typically from about 3:1 to about 1:3, and more typically from about 2:1 to about 1:2, and most typically 1:1, although other ratios are possible.

In the practice of the various embodiments of the disclosed method, any amount of aluminum silicate and/or fibrous mineral suitable for achieving the stress resistant benefits of the disclosed cement compositions described herein may be employed. Typically a stress resistant cement composition comprises from about 1% to about 75%, more typically from about 1% to about 50%, more typically from about 1% to about 25%, more typically from about 1% to less than 20%, and more typically from about 4% to about 15%, and most typically about 10% aluminum silicate and/or fibrous mineral by weight of base cement ("BWOC"). More typically, such a stress resistant cement comprises greater than 5%, more typically from greater than 5% to about 75%, more typically from greater than 5% to about 50%, more typically from greater than 5% to about 25%, more typically from greater than 5% to about 15%, and most typically from greater than 5% to about 12% aluminum silicate and/or fibrous mineral by weight of base cement BWOC. However, other amounts of aluminum silicate and/or fibrous mineral may be employed, including amounts greater than about 75% BWOC, amounts greater than 50% BWOC, amounts greater than 7% BWOC, and amounts less than 5% BWOC.

In the practice of the disclosed method, aluminum silicate and/or fibrous minerals are typically mixed with hydraulic cement to form a stress resistant cement system or composition. To form a cement slurry, stress resistant cement system or composition is typically mixed with fresh water, but may also be mixed with sea water or any other suitable aqueous-based fluid including but not limited to formation brine, KCl water, NaCl water, sea water, drill water, drilling mud or mixtures thereof. However, it will be understood with benefit of the present disclosure that one or more aluminum silicates and/or fibrous minerals may be added at any point in a cement slurry mixing process, including after a hydraulic cement has been mixed with an aqueous based fluid, and/or optionally mixed with an aqueous base fluid prior to mixing with a hydraulic cement.

The water requirement of a cement slurry may be varied to achieve desired density and pumpability. In this regard any amount of water suitable for forming an aluminum silicate and/or fibrous mineral-containing cement slurry suitable for placement in a wellbore may be employed. For example, a typical stress-resistant cement slurry density may be formulated to be between about 11 lbm/gal and about 19 lbm/gal, and more typically between about 16.0 lbm/gal and about 15.0 lbm/gal. However, any other slurry density suitable for use in a wellbore may be employed, including less than about 11 lbm/gal or greater than about 19 lbm/gal. The system may also be formulated with lightweight additives including, but not limited to, additives such as microspheres and/or foamed with nitrogen gas or other suitable energizing phase to achieve lower densities, for example, to obtain densities as low as about 0.96 g/cm$^3$ (8 lbm/gal).

The disclosed stress resistant cement compositions may also be optionally formulated to contain consolidating fibers, such as nylon or polypropylene fibers, to reduce the potential for cement debris formed under high stress conditions. Advantageously, consolidating fibers tend to reduce or substantially eliminate fragmentation of a cement mass once it has failed, thus preventing pieces of loose cement from entering the wellbore, where they may interfere with, among other things, the operation of downhole assemblies, fluid production/injection, etc. In this regard, any natural or synthetic fiber type material suitable for consolidating or otherwise holding together the bulk of a cement mass after the cement has shattered, broken or otherwise failed, may be employed. Suitable examples of consolidating fibers include, but are not limited to, at least one of carbon fibers, nylon fibers, polypropylene fibers, or a mixture thereof. One specific example of suitable consolidating fibers are ½" "NYCON" nylon fibers available from Nycon, Inc. of Westerly, R.I. These nylon fibers may be characterized as having a specific gravity of about 1. 16, a melting point of about 435° F., a tensile strength of about 130 ksi, and a Young's modulus of about 750 ksi. Another specific example of suitable consolidating fibers are ½" fibermix polypropylene fibers, available from Fibermesh of Chattanooga, Tenn. These polypropylene fibers may be characterized as having a specific gravity of about 0.9, a melting point of about 340° F., and an ignition point of about 1100° F. Most typically, a polypropylene fiber such as this is employed as a consolidating fiber. Consolidating fibers are typically added or blended into a cement composition in an amount of between about ¼ and about 5 pounds per sack ("pps"), more typically between about 2 and about 5 pps, and most typically between about 4 and about 5 pps. However, amounts greater than about 5 pps and less than about ¼ pps may also be employed. Furthermore, it will be understood with benefit of this disclosure that consolidating fibers other than the specific types described above may be employed.

In embodiments of the disclosed methods and compositions, other additives, including any suitable cementing additives known to those of skill in the art may be employed in the formulation of an aluminum silicate and/or fibrous mineral-containing cement slurry. Optional additives may be used, for example, to further vary characteristics of an aluminum silicate-containing cement slurry, including to further vary viscosity, further control fluid loss, further immobilize water between particles, to further impart variable thixotropic properties to a cement slurry, to vary transition time, etc. Examples of typical additives include, but are not limited to, accelerators, dispersants, viscosifiers, fluid loss control agents, set retarders, low density additives, weighting agents, thinners, foamers, lost circulation materials, energizing gases (such as nitrogen gas, air, etc.). Thus, a cement slurry may be formulated, for example, to meet a given situation and to provide a reduced transition time while at the same time providing a density compatible with formation pressure gradients in order to avoid cement loss to the formation. For example, embodiments of the disclosed cement slurries typically may include greater amounts of accelerator additives for use in relatively cold downhole environments, and lesser amounts of such additives for use at relatively higher downhole temperature.

In one embodiment, one or more additives suitable for decreasing transition time may optionally be employed. Examples of such additives include gypsum, calcium chloride, sodium silicate, metasilicate, or mixtures thereof. As a particular example, an aluminum silicate and/or fibrous mineral-containing cement may include between about 1% and about 15%, and more typically between about 1% and about 10% gypsum BWOC, such as "A-10" gypsum available from BJ Services. However, amounts greater than about 15% gypsum BWOC and less than about 1% gypsum BWOC are also possible.

A cement slurry embodiment may also include optional cement fluid loss control additives, especially when low pressure or "thief" zones are suspected to be present.

Such additives include any additive/s suitable for controlling fluid loss from a cement slurry prior to setting. Typical fluid loss control additives include, but are not limited to, materials such as hydroxyethyl cellulose ("HEC"), HEC blends, carboxymethyl hydroxyethyl cellulose ("CMHEC"), CMHEC blends, polyethylene imine ("PEI"), copolymers of acrylamide and acrylic acid, polyvinyl alcohol ("PVA"), PVA blends, etc.

Other examples of suitable additives include, but are not limited to, 2-acrylomido, 2-methyl propane sulfonic acid, ("AMPS") copolymers, or mixtures thereof. Other fluid loss control additives may also be employed. Such fluid loss control additives are typically employed in an amount of from about 0.1% to about 3%, more typically from about 0.1% to about 2%, and most typically in an amount of from about 0.1% to about 1.5% BWOC, although other amounts (such as amounts greater than about 3% BWOC) are also possible. In one typical embodiment, between about 0.1% and about 3.0%, and more typically from about 0.1% to about 1.5% of "FL-33" fluid loss control additive BWOC (available from BJ Services) is employed.

Any additive/s suitable for controlling fluid flow may also be optionally employed including, but not limited to, polyvinyl alcohol-based anti-fluid flow additives. For example, in one embodiment a polyvinyl alcohol fluid flow additive (such as "BA-10" available from BJ Services) is typically used in an amount of between about 0.1% and about 3.0%, more typically from about 0.1% to about 1.5% BWOC, although other amounts are possible.

Accelerators may also be optionally employed. In this regard, any additive/s suitable for well cementing may be used including, but not limited to, calcium chloride potassium chloride, sodium chloride, NaCl, seawater, sodium silicate, sodium metasilicate, or mixtures thereof. In one typical embodiment, between about 0.1% and about 4%, more typically from about 0.1% to about 2% of "A-7" calcium chloride BWOC (available from BJ Services) may be employed in formulating a slurry, although other amounts are possible.

Any dispersant additive/s suitable for facilitating the mixing of wet and dry materials in a slurry and/or activating dry materials may also be used including but not limited to, dispersants such as naphthalene sulfonate, ethoxylated napthalene sulfonate or ketone-acetone sulfonate. Such additives may be particularly useful, for example, when lower water to cement ratios are employed. In one typical embodiment, between about 0.1% and about 3g%, more typically from about 0.1% to about 1.0% of ketone-acetone sulfonate, ethoxylated napthalene sulfonate, or naphthalene sulfonate (such as "CD-33," "CD-32" or "CD-31", respectively, available from BJ Services) BWOC is used, although other amounts are possible.

Low density additives may also be optionally employed. In this regard, any additives suitable for lowering slurry density may be used including, but not limited to, sodium silicate, sodium metasilicate, hollow microspheres, or mixtures thereof. In one typical embodiment, between about 1% and about 75%, more typically from about 1% to about 50% of a lightweight additive such as hollow ceramic microspheres available as "LW-6" BWOC (available from BJ Services) may be employed in formulating a slurry, although other amounts are possible.

Set retarders may also be optionally used. Any set retarder composition suitable for retarding or otherwise delaying, the setting, of an aluminum silicate-containing cement, such as for increasing pumping time of a cement slurry, may be used. Examples include, but are not limited to, lignosulfonates, sugars, phosphonates, or mixtures thereof. In one typical embodiment, between about 0.1% and about 3%, more typically from about 0.1% to about 1.0% of a sodium lignosulfonate cement retarder "R-3" BWOC (available from BJ Services) may be employed as a set retarder, although other amounts are possible.

By using additives in combination with aluminum silicate and hydraulic cement, and with benefit of this disclosure, stress resistant cement com positions may be formulated to produce desired characteristics, such as high early compressive strength, to fit particular applications at specific temperatures or ranges of temperatures, if so desired.

In this regard, suitable additives include, but are not limited to, one or more of those additives mentioned elsewhere herein. For example, in one most typical embodiment, cement slurry comprises between about 30% and about 100% by weight of one cubic foot of hydraulic cement and from about 1 to about 40% of aluminum silicate BWOC. In this embodiment, the aluminum silicate-containing cement slurry possesses a transition time of between about 30 minutes to about 35 minutes (as determined by a Halliburton "ACS" analyzer).

It will be understood with the benefit of this disclosure that a cement slurry may also contain other conventional additives including but not limited to additives for controlling free water or solid separation, silica fume, glass or ceramic microspheres, perlite, biopolymers, etc.

When so desired, a cement slurry containing aluminum silicate and/or fibrous materials may be foamed utilizing a foaming agent, optional stabilizer, and an energizing phase. In this regard, any foaming agent and/or stabilizer suitable for creating a stable foamed aluminum silicate and/or fibrous mineral-containing cement slurry, may be employed in any amount suitable for obtaining a foamed cement slurry. In the case of salt water based cement slurries, a foaming agent typically includes, but is not limited to, oxyalkylated sulfates or ethoxylated alcohol sulfates, or mixtures thereof. Most typically "FAW-20" ethoxylated alcohol sulfate foaming agent available from BJ Services is utilized. Suitable salt water stabilizers include, but are not limited to, polyvinyl alcohol, sodium silicate, or mixtures thereof. Most typically, a polyvinyl alcohol stabilizer known as "BA-10" and available from BJ Services is used. In the case of fresh water based cement slurries, a foaming agent typically includes, but is not limited to, oxyalkylated sulfates or ethoxylated alcohol sulfates, or mixtures thereof. Most typically "FAW-20" foaming agent available from BJ Services is utilized. Suitable fresh water stabilizers include, but are not limited to, polyvinyl alcohol or sodium silicate, or mixtures thereof. Most typically, "BA-i 0" stabilizer available from BJ Services is used.

Any energizing phase composition suitable for forming a foamed aluminum silicate or fibrous mineral-containing cement may be employed including but not limited to gaseous material such as carbon dioxide, nitrogen, liquid petroleum gases (such as liquefied natural gas and liquefied petroleum gas, etc.), or a mixture thereof. An energizing phase is typically added to a mixture of cement, aqueous fluid, surfactant and stabilizer. The slurry density may be controlled with benefit of this disclosure by adjusting the amount of energizing phase added to an unfoamed cement slurry. For example, in one embodiment the density of a cement slurry may be adjusted from about 8 to about 15 lbs/gal by adding from about 1500 to about 25 standard cubic feet (SCF) of nitrogen gas at standard conditions per barrel (bbl) of unfoamed cement slurry, although any other amounts suitable for obtaining a foamed cement slurry are possible.

One or more defoaming additives may also be optionally used with aluminum silicate-containing foamed cement slurries to prevent foaming during mixing and pumping of a foamed slurry. In this regard, any defoaming additive suitable for cementing operations may be employed including, but not limited to, glycol, alcohols or silicones, or mixtures thereof. Most typically "FP-12L" defoaming additive available from BJ Services is employed in an amount of from about 0.01 to about 0.5 gallons per sack ("GPS") concentration, most typically from about 0.05 to about 0.1 GPS concentration, although other amounts are possible.

In either salt water or fresh water based cement slurries, any suitable energizing phase, including but not limited to nitrogen, $CO_2$, air, natural gas or mixtures thereof may be employed in a sufficient amount to achieve the desired density of cement, typically in an amount of between about 10 SCF/bbl and about 2000 SCF/bbl at standard conditions, most typically between about 100 SCF/bbl to about 1000 SCF/bbl, although other amounts are possible. Most typically nitrogen is employed.

It will also be understood with benefit of this disclosure that the disclosed stress resistant cement operations may be employed with benefit in cementing operations performed in wells having conventional levels or risk of stress induced cement failure, or in wells in which situations other than those described herein create stress in set cement. In this regard, it will be understood that "cementing operations" as used herein means any type of wellbore cementing application known in the art including, but not limited to, long string cementing, liner cementing, inflatable/external packer cementing, squeeze cementing, plug back cementing, temporary plug cementing, casing repair cementing, zone isolation cementing, etc. Such operations include, but are not limited to, drilling, completion and remedial cementing operations, including those performed on existing completed wellbores, as well as those cementing operations performed during well abandonment operations.

Furthermore, it will be understood with benefit of this disclosure that although typical ranges and amounts of hydraulic cement, aluminum silicate, fibrous minerals and additives are described and illustrated herein, any other amounts of these components and/or other additives may be suitably employed where the benefits of the disclosed stress resistant cement systems may be realized as described elsewhere herein. It will also be understood that although specific typical embodiments of cementing procedures using aluminum silicate and/or fibrous mineral-containing cement slurries have been described herein, an aluminum silicate and/or fibrous mineral-containing cement slurry may be mixed, pumped, spotted, or otherwise introduced into a wellbore and/or wellbore annulus in any manner known to those of skill in the art. Furthermore, an aluminum silicate and/or fibrous mineral-containing cement slurry may be formulated with benefit of this disclosure in any suitable manner known to those of skill in the art including, but not limited to, by continuous mixing, batch mixing, etc.

EXAMPLES

The following examples are illustrative and should not be construed as limiting the scope of the invention or claims thereof.

Example 1

The tensile and flexural strengths data for the tests of Example 1 were generated on a Gilson Company "Model HM-138" Cement Strength Tester. The test apparatus consists of an aluminum frame containing the load transmission, machine controls, and a loading beam positioned at one side of the frames. The flexural strengths were determined using 1.575 by 1.575 by 6.3-in. cement prisms using test methods outlined in ASTM C 348, *"Standard Test Method for Flexural Strength of Hydraulic Cement Mortars"*. The tensile strengths were determined using a briquette mold method as found in ASTM C 190-85, *"Tensile Strength of Hydraulic Cement Mortars"*. All compressive strength testing was conducted in accordance with API Spec 10, *"Specification for Materials and Testing for Well Cements"*, Jul. 1, 1990. All slurries were prepared according to Section 5 of the aforementioned document.

In this example, nine cement composition mixes were formulated and their compressive, flexural, and tensile strengths compared. Among the cement composition mixes evaluated included a conventional Class H "neat" cement (Mix No. 1), as well as Class H cement mixes containing conventional additives (Mix. Nos. 2, 3, 4, 5, and 9). In each case, a Class H cement slurry having a density of 16.5 lbs/gal (PPG) was prepared using fresh mix water. Table 1 indicates the components of the cement as well as additional information, such as yield and cubic feet per sack as well as mix water in gals per sack (GPS).

Tables 1 and 2 summarize the results of strength testing for each of the mixes tested, as well as outline the effects of various additives on compressive, flexural, and tensile strength. In this regard, the results of the testing is further summarized below.

Mix number 1 is a "neat" Class H cement containing 38% mix water, this "blank" design serves as a baseline for comparison. Mix number 2 contains 5.32% BWOC or 5 pounds per sack ("pps") of nylon fibers. As may be seen, the nylon fiber produces a small gain in tensile strength, a decrease in flexural strength, and similar compressive strength as the blank.

Mix number 3, containing 100 gallons per hundred sacks ("GHS") of "BA-86L", a styrene-butadiene resin available from BJ Services, produced 15.5% greater tensile strength than the blank, 9.53% greater flexural strength than the blank, but 3.3% less compressive strength than mix number 1. Mix number 4, containing 200 GHS "BA-86L" had a 32.1% increase in tensile strength, 3.6% increase in flexural strength, and a 23.4% increase in compressive strength as compared to the blank. Mix number 5, containing 100 GHS of "FL-45LS" polyvinyl alcohol-based liquid fluid loss additive (available from BJ Services), produced a 9.3% increase in tensile strength, less than 1 percent increase in flexural strength, and a 13.5% increase in compressive strength.

Mix number 6, containing 5% BWOC "VANSIL W-10" wollastonite fibers produced a 29.7% increase in tensile strength, a 43.7% increase in flexural strength, and a 24.4% increase in compressive strength as compared to the blank design. Increasing the wollastonite concentration to 10% BWOC (Mix number 7) increased the tensile strength, flexural strength, and compressive strength to 60%, 56% and 45% above that of the blank, respectively.

Mix number 8 contains 10% "METAMAX" high reactivity metakaolin. This design produced very good results. Tensile strength was increased 92%, flexural strength by 75% and compressive strength by 85% over the blank.

Mix number 9 contained an increased amount of the same polyvinyl alcohol-based liquid fluid loss additive found in mix number 5. A decrease in compressive, tensile, and flexural strength were noted.

TABLE 1

Data from Example 1

| Mix No. | Cement | Density (PPG) | Yield Cu ft/SK | Mix Water Type | Mix Water GPS | 1/2" Nylon (BWOC) | BA-86L (GHS) | FL-45LS (GHS) | "VANSIL" W-10" | CD-32 (BWOC) | "METAMAX" (BWOC) |
|---|---|---|---|---|---|---|---|---|---|---|---|
| 1 | H | 16.5 | 1.05 | Fresh | 4.28 | | | | | | |
| 2 | H | 16.5 | 1.05 | Fresh | 4.28 | 5.32 | | | | | |
| 3 | H | 16.5 | 1.05 | Fresh | 4.28 | | 100 | | | | |
| 4 | H | 16.5 | 1.05 | Fresh | 4.28 | | 200 | | | | |
| 5 | H | 16.5 | 1.06 | Fresh | 4.31 | | | 100 | | | |
| 6 | H | 16.5 | 1.10 | Fresh | 4.44 | | | | 5.0 | | |
| 7 | H | 16.5 | 1.15 | Fresh | 4.63 | | | | 10.0 | 0.2 | |
| 8 | H | 16.5 | 1.14 | Fresh | 4.50 | | | | | 0.4 | 10.0 |
| 9 | H | 16.5 | 1.06 | Fresh | 4.36 | | | 200 | | 0.5 | |

CD-32 = ethoxylated napthalene sulfonate available from BJ Services.

TABLE 2

Data from Example 1

| Mix No. | Temp °F. | Time Hr | Compressive Strength psi | Compressive Strength % of Neat Cmt | Flexural Strength psi | Flexural Strength % of Neat Cmt | Tensile Strength psi | Tensile Strength % of Neat Cmt |
|---|---|---|---|---|---|---|---|---|
| 1 | 120 | 24 | 3150 | 0 | 866 | 0 | 358 | 0 |
| 2 | 120 | 24 | 3263 | 103.59 | 819.6 | 94.64 | 400.7 | 111.93 |
| 3 | 120 | 24 | 3045 | 96.66 | 948.5 | 109.53 | 413.6 | 115.53 |
| 4 | 120 | 24 | 3888 | 123.43 | 897.9 | 103.68 | 473.1 | 132.15 |
| 5 | 120 | 24 | 3642 | 113.51 | 874.4 | 100.97 | 391.3 | 109.30 |
| 6 | 120 | 24 | 3921 | 124.47 | 1244.7 | 143.73 | 464.4 | 129.72 |
| 7 | 120 | 24 | 4567 | 144.98 | 1350 | 155.88 | 572.72 | 159.98 |
| 8 | 120 | 24 | 5829 | 185.05 | 1518 | 175.29 | 689.4 | 192.56 |
| 9 | 120 | 24 | 1935 | 61.43 | 605.3 | 69.99 | 264.2 | 77.38 |

CS = compressive strength

Example 2

The flexural strength information for tests 1 through 9 of Example 2 were determined by means of a simple beam with center point loading-type apparatus. The device conforms to ASTM C 293-79, "Standard Test Method for Flexural Strength of Concrete (Using Simple Beam With Center-Point Loading)".

As with Example 1, the tensile and flexural strengths data for tests 10 through 27 of Example 2 were generated on a Gilson Company "Model HM-138" Cement Strength Tester. The test apparatus consists of an aluminum frame containing the load transmission, machine controls, and a loading beam positioned at one side of the frames. The flexural strengths were determined using 1.575 by 1.575 by 6.3-in. cement prisms using test methods outlined in ASTM C 348, "Standard Test Method for Flexural Strength of Hydraulic Cement Mortars". The tensile strengths were determined using a briquette mold method as found in ASTM C 190-85, "Tensile Strength of Hydraulic Cement Mortars". All compressive strength testing was conducted in accordance with API Spec 10, "Specification for Materials and Testing for Well Cements", Jul. 1, 1990. All slurries were prepared according to Section 5 of the aforementioned document.

The results of an initial screen for additive effects on flexural strength (as determined by center point loading) are shown in Table 3 for Test Slurries 1–9 (the reported flexural strength values are the average of four samples). The ineffectiveness of a conventional reinforcing material, ½" fiber-mix polypropylene fibers (from Fibermesh of Chattanooga, Tennessee), is demonstrated by the results of Test Slurry 2 compared to the results of the neat Class G found in Test Slurry 1. The 5 pounds per sack (pps) loading of the polypropylene fiber represents the maximum concentration that can be added to the cement without causing a failure in the field mixing equipment. Under the test conditions, the polypropylene fiber containing cement offers no advantage in flexural strength with a substantial decline in compressive strength as compared to the neat Class G.

The next series of Test Slurries (3–8) examine the effects of increasing styrene-butadiene resin ("SBR") concentration on flexural strength. In this case, the flexural strength of the sample was raised from the neat Class G baseline of 377 pounds per square inch (psi) to 442 psi for the sample containing 50 gallons per 100 sacks (GHS) of SBR latex. As the concentration of SBR is increased in 50 GHS increments there is a corresponding increase in flexural strength. At 300 GPS SBR concentration, the maximum flexural strength of 808 psi was attained. Another latex-type of system, containing a liquid polyvinyl alcohol (PVA) and "CD-31L" (a sodium napthalene formaldehyde condensate available from BJ Services), was also tested (Test Slurry # 9). Results indicate the flexural strength attained (744 psi) approximately equaled the flexural strength developed by the system containing 250 GHS of the SBR latex (Test #7).

The results of Test Slurries # 1–9 show: (1) a trend of increasing flexural strength with increasing SBR latex concentration; (2) a diminished compressive strength with no appreciable effect on flexural strength with the addition of polypropylene fiber at 5 pps and; (3) an improvement in flexural strength with the addition of 120 GHS Liquid PVA, equaling the flexural strength found with the 250 GHS SBR latex system.

A second data set, incorporating compressive, flexural, and tensile strengths are shown in Test Slurries #10–21. A neat Class H (Test Slurry #10) serves as the comparative baseline. Test slurry #11 reveals the addition of 5 pps ½" "NYCON" nylon fiber yielding a slight increase in compressive and tensile strengths, and a slight decrease in flexural strength compared to the neat Class H. As with the polypropylene fiber testing with the Class G cement (Test Slurry #2), there is no significant enhancement to the mechanical properties of the cement by adding these fibers.

Visual inspection of the nylon and polypropylene-containing samples did indicate, however, that once the samples had been broken, the shattered fragments of the cement were held intact by the fibers. This effect is of obvious benefit in a multi-lateral junction cement design, or in other high stress situations, where fragments of cement can drop down the wellbore and cause problems with downhole equipment.

SBR-based slurry designs (Test Slurries #12–13) show mixed results as the 100 GHS design produced a higher flexural strength than the 200 GHS design. The 200 GHS latex design generated a higher compressive and tensile strength. In general, the addition of the SBR latex did yield slurries with higher flexural and tensile strength than the neat Class H.

The results of testing with two mineral admixtures are shown in test slurry number 15 and 16. Test slurry number 15 contains 10% (BWOC) of "VANSIL W-10" wollastonite fiber. The compressive strength of the sample is approximately 45% greater than the neat Class H. The flexural strength is of the material increased by 55% over the neat H, with the tensile strength being improved by 60% as compared to the Class H cement. Slurry number 16, containing 10% (BWOC) "METAMAX" high reactivity metakaolin (HRM) produced even more impressive results. As indicated by the results, the Class H slurry containing HRM attained 85% greater compressive strength, 75% higher flexural strength, and a 92% improvement in tensile strength.

At a 170° F. test temperature (Test Slurries 17–21) the results were as follows: Test Slurry #18, containing 5 pps ½" "NYCON" nylon fibers, exhibited lower compressive and flexural strength than the neat Class H cement (Test Slurry #17), with only a slight improvement in tensile strength. The 100 GHS SBR slurry (Test Slurry #19) gave a lower compressive strength value than the neat Class H, but improved flexural strength by 8% and tensile strength by 19 percent. The "VANSIL W-10" wollastonite fiber-containing slurry (Test Slurry #20) produced a slight decrease in compressive strength, yet improved flexural strength by 22% and tensile strength by 12% as compared to the neat Class H (Test Slurry #17) As found in the 120° F. testing, the slurry containing 10% (BWOC) "METAMAX" metakaolin (Test Slurry #21) produced the highest percentage gain in compressive strength (13%), flexural strength (44%), and tensile strength (42%) over the neat Class H slurry (Test Slurry #17).

TABLE 3

Data from Example 2

| Test # | Base Cement | Density Lbm/gal | Temp ° F. | Additive #1 | (Dispersant) | 24 Hr Comp. Strength (Psi) | 72 Hr Flexural Strength (Psi) | 24 Hr Tensile Strength (Psi) |
|---|---|---|---|---|---|---|---|---|
| 1 | Class G | 15.9 | 140 | | | 4612 | 377 | |
| 2 | Class G | 15.9 | 140 | 5 pps Polypropylene fiber | | 3250 | 377 | |
| 3 | Class G | 15.9 | 140 | 50 GHS SBR Latex | | | 442 | |
| 4 | Class G | 15.9 | 140 | 100 GHS SBR Latex | | | 463 | |
| 5 | Class G | 15.9 | 140 | 150 GHS SBR Latex | | | 614 | |
| 6 | Class G | 15.9 | 140 | 200 GHS SBR Latex | | | 679 | |
| 7 | Class G | 15.9 | 140 | 250 GHS SBR Latex | | | 733 | |
| 8 | Class G | 15.9 | 140 | 300 GHS SBR Latex | | | 808 | |
| 9 | Class G | 15.9 | 140 | 120 GHS "FL.45LS" Liquid PVA | 20 GHS "CD-31L" | | 744 | |
| 10 | Class H | 16.5 | 120 | | | 3150 | 866 | 358 |
| 11 | Class H | 16.5 | 120 | 5 pps Nylon Fiber | | 3263 | 819 | 400 |
| 12 | Class H | 16.5 | 120 | 100 GHS SBR Latex | | 3045 | 948 | 413 |
| 13 | Class H | 16.5 | 120 | 200 GHS SBR Latex | | 3888 | 898 | 473 |
| 14 | Class H | 16.5 | 120 | 100 GHS "FL.45L5" Liquid PVA | | 3642 | 874 | 391 |
| 15 | Class H | 16.5 | 120 | 10% (BWOC) Wollastanite Fiber | 0.2% CD-32 BWOC | 4567 | 1350 | 573 |
| 16 | Class H | 16.5 | 120 | 10% (BWOC) "METAMAX" HRM | 0.4% | 5829 | 1518 | 689 |
| 17 | Class H | 16.5 | 170 | | | 5733 | 1276 | 428 |
| 18 | Class H | 16.5 | 170 | 5 pps Nylon Fiber | | 5425 | 1007 | 442 |
| 19 | Class H | 16.5 | 170 | 100 GHS SBR Latex | | 5177 | 1378 | 511 |
| 20 | Class H | 16.5 | 170 | 10% (BWOC) Wollastanite Fiber | 0.2% | 5717 | 1555 | 479 |
| 21 | Class H | 16.5 | 170 | 10% (BWOC) "METAMAX" HRM | 0.4% | 6500 | 1845 | 610 |
| 22 | Class G | 15.8 | 120 | | 0.2% | 4012 | 1097 | 425 |
| 23 | Class G | 15.8 | 120 | 100 GHS SBR Latex | | 3488 | 915 | 422 |
| 24 | Class G | 15.8 | 120 | 10% (BWOC) Wollastanite Fiber | 0.2% | 3799 | 1138 | 373 |

TABLE 3-continued

Data from Example 2

| Test # | Base Cement | Density Lbm/gal | Temp ° F. | Additive #1 | (Dispersant) | 24 Hr Comp. Strength (Psi) | 72 Hr Flexural Strength (Psi) | 24 Hr Tensile Strength (Psi) |
|---|---|---|---|---|---|---|---|---|
| 25 | Class G | 15.8 | 120 | 10% (BWOC) "METAMAX" HRM | 0.3% | 5212 | 1539 | 498 |
| 26 | Class G | 15.8 | 170 | | 0.2% | 4173 | 1092 | 353 |
| 27 | Class G | 15.8 | 170 | 10% GHS ___ SBR Latex | | 3707 | 1171 | 442 |
| 28 | Class G | 15.8 | 170 | 10% (BWOC) "VANSIL W-10" CASiO2 Fiber | 0.2% | 3920 | 1237 | 406 |
| 29 | Class G | 15.8 | 170 | 10% (BWOC) "METAMAX" HRM | 0.3% | 4865 | 1470 | 484 |

Although particular exemplary embodiments of the disclosed compositions have been described and illustrated herein, it will be understood with benefit of this disclosure that benefits of the disclosed cement compositions and cementing methods may be realized in any type of wellbore cementing application, including in completion, remedial, workover, and/or abandonment cementing applications using cementing methods known in the art. Examples of specific applications include, but are not limited to, cementing casing and liner strings, inflatable packers, squeezing perforations and casing leaks, etc.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed compositions and methods may be utilized in various combinations and/or independently. Thus the invention is not limited to only those combinations shown herein, but rather may include other combinations.

What is claimed is:

1. A method of cementing within a wellbore, comprising:

mixing hydraulic cement and wollastonite with an aqueous-based fluid to form a cement slurry; each of said hydraulic cement and said wollastonite materials being added and mixed in at least one of a batch mix cement slurry mixing process or a continuous mix cement slurry mixing process; then introducing said cement slurry into a wellbore; and allowing said cement slurry to set within said wellbore;

wherein the hydraulic cement present in said cement slurry consists essentially of Portland cement.

2. The method of claim 1, wherein said mixing further comprises mixing high reactivity metakaolin with said aqueous-based fluid to form said cement slurry, said high reactivity metakaolin comprising:

calcined anhydrous kaolin $Al_2O_3 \cdot SiO_2$ composed of 97% $SiO_2+Al_2O_3+Fe_2O_3$ having an average particle size of about 1.5 $\mu M$, and a specific gravity of about 2.5; or calcined anhydrous kaolin $Al_2O_3SiO_2$ composed of 98% $SiO_2+Al_2O_3+Fe_2O_3$ heaving an average particle size of about 0.5 $\mu M$, and a specific gravity of about 2.5; or a mixture thereof.

3. The method of claim 1, wherein said wollastonite comprises calcium silicate acicular shaped micro fibers having fiber lengths of about 0.4–0.6 mm and fiber diameters of about 25–40 $\mu m$, and having the characteristic of 97.3% passing through a 200 mesh screen, a pH of about 10, and a specific gravity of about 2.9.

4. The method of claim 1, wherein said cement slurry comprises greater than 50% of said wollastonite by weight of cement, and wherein said wellbore has a static bottom hole temperature of greater than about 300° F.

5. The method of claim 3, wherein said cement slurry is introduced into an existing completed wellbore as part of a completion, workover, remedial or abandonment cementing operations.

6. The method of claim 1, wherein at least one of the following conditions exist:

wherein said introducing further comprises introducing said cement slurry into an annulus existing between a pipe and said wellbore; and wherein a theoretical annular clearance between an outside surface of said pipe and an interior surface of said wellbore is less than about 0.5 inches; or wherein said wellbore comprises a primary wellbore and one or more secondary lateral wellbores, and wherein said step of introducing further comprises introducing said cement slurry into an annulus existing between a pipe and at least one of said one or more secondary lateral wellbores; or wherein at least a portion of said wellbore is horizontal or highly deviated.

* * * * *